United States Patent
Hechler et al.

(10) Patent No.: US 6,648,956 B1
(45) Date of Patent: Nov. 18, 2003

(54) PIGMENT PREPARATION

(75) Inventors: Wolfgang Hechler, Lautertal (DE); Gerhard Herget, Ober-Ramstadt (DE); Brigitte Husseini, Darmstadt (DE); Sabine Schoen, Darmstadt (DE)

(73) Assignee: Merck Patent Gesellschaft mit beschraenkter Haftung, Darmstadt (DE)

( * ) Notice: Subject to any disclaimer, the term of this patent is extended or adjusted under 35 U.S.C. 154(b) by 0 days.

(21) Appl. No.: 09/715,049

(22) Filed: Nov. 20, 2000

(30) Foreign Application Priority Data

Nov. 18, 1999 (DE) .......................... 199 55 477

(51) Int. Cl.$^7$ .......................... C04B 14/20; C09C 1/04; C09C 1/36; C08K 5/00; B32B 15/02
(52) U.S. Cl. .......................... 106/415; 106/417; 106/418; 106/430; 106/436; 106/439; 106/447; 106/499; 428/403
(58) Field of Search ................................ 106/415, 417, 106/418, 430, 436, 439, 447, 499; 428/403

(56) References Cited

U.S. PATENT DOCUMENTS

| | | | | |
|---|---|---|---|---|
| 3,840,381 A | * | 10/1974 | Watanabe | 106/291 |
| 4,154,622 A | * | 5/1979 | Momoi et al. | 106/308 F |
| 5,116,664 A | * | 5/1992 | Kimura et al. | 428/216 |
| 5,302,199 A | * | 4/1994 | Prengel et al. | 106/417 |
| 5,672,200 A | * | 9/1997 | Heinz et al. | 106/403 |
| 5,958,123 A | * | 9/1999 | De La Fuente | 106/31.69 |
| 6,129,784 A | * | 10/2000 | Ikuta et al. | 106/417 |
| 6,139,962 A | * | 10/2000 | Herget et al. | 428/404 |
| 6,238,472 B1 | * | 5/2001 | Andes et al. | 106/430 |
| 6,270,563 B1 | * | 8/2001 | Herget et al. | 106/415 |
| 6,398,862 B1 | * | 6/2002 | Hechler et al. | 106/404 |
| 6,432,195 B1 | * | 8/2002 | Rathschlag et al. | 106/500 |

\* cited by examiner

*Primary Examiner*—Mark L. Bell
*Assistant Examiner*—Patricia L. Hailey
(74) *Attorney, Agent, or Firm*—Millen, White, Zelano & Branigan, P.C.

(57) ABSTRACT

The invention relates to a nondusting, solvent-containing homogeneous pigment preparation that includes ≧70% by weight of one or more effect pigments 0.1–30% by weight of an organic solvent or solvent mixture having an evaporation number (EN) of 10 to 100 and a surface tension (ST) of ≦35 mN/m and optionally 0–5% by weight of a surface-active substance.

29 Claims, No Drawings

PIGMENT PREPARATION

SUMMARY OF THE INVENTION

The invention relates to a nondusting, solvent-containing, homogeneous pigment preparation and its use, especially in printing inks.

Industrial processes frequently do not utilize pigments as dry powders, since these dust, which leads to heightened requirements with regard to workplace safety. Furthermore, the incorporation of powders into plastics, base coating systems, etc. is frequently accompanied by an agglomeration of the pigment powder. Homogeneous disbursement of the pigment in the respective matrix is frequently very difficult to achieve, if at all.

Nondusting pigment preparations are used instead of pigment powder. They are
- pigmented free-flowing powders having a low moisture content, as known for example from DE-A-41 39 993,
- pigmented powders having a higher moisture content, frequently also referred to as pastes because of their flowable consistency, or
- pearl luster pigments coated with an alkylene glycol alkyl ether in amounts of 5–20% by weight, as known from U.S. Pat. No. 5,234,496.

Pastes are an industrial alternative to dry or moistened powders, provided they meet the following general conditions:
flowable consistency
very low dilatancy
very high pigment content The components of the preparation should be such that the preparation is highly compatible with the other components of the particular coating system and readily disperses homogeneously on incorporation.

As well as good compatibility with the other constituents of the coating system, pigment preparations have to have high stability, ie. they must neither tend to phase separate, nor change their overall composition. This requirement is particularly important in the case of pigment preparations based on platelet-shaped pigments, since these tend to phase separate because of their loose structure. For instance, a solvent-containing pigment preparation obtained by pasting up a powder composed of pearl luster pigments, solvent and water will frequently lack stability and the components separate and the upper regions of the fill fall dry.

Pigment preparations that contain excessively volatile substances, for example low-boiling organic solvents, generally have the disadvantage of being instable in composition as a consequence of the volatility of the solvent. Furthermore, pearl luster pigments are difficult to wet with organic substances and solvents because of high surface tension, since these pigments have a sandwich structure and so possess a particularly large number of pores at the surface in particular and these pores are largely also very difficult to access for liquid substances (in contrast to conventional organic and inorganic pigments).

The solvent-containing pearl luster pigment preparations hitherto developed for use in coating systems, and having a pigment fraction >30% by weight and <70% by weight, do not fully meet the requirements described, especially because they tend to shear thicken.

The present invention therefore provides a free-flowing pigment preparation that contains at least 70% by weight of effect pigments. The preparation shall have high stability in storage and possess excellent compatibility with the other components of the coating system.

A particular concern in printing is that, once it has been applied, a printing ink should very quickly be freed of all volatile components, so that there is no detectable odor of these substances in the dry product (Robinson test). Care must therefore also be taken to ensure that the evaporation number does not exceed a certain upper limit.

It has been found that this is achieved by the pigment preparation of the invention.

The invention accordingly provides a nondusting, homogeneous pigment preparation, which includes
$\geq 70\%$ by weight of one or more effect pigments,
0.1–30% by weight of an organic solvent or solvent mixture having an evaporation number (EN) of 10 to 100 and a surface tension (ST) of $\leq 35$ mN/m
and optionally
0–20% by weight of a surface-active substance.

The preparation of the invention is, depending on the moisture content, a free-flowing powder which is particularly suitable for incorporation into printing inks. More particularly, the preparation of the invention shortens the time needed to stir the pigment into the printing ink. Furthermore, it dramatically reduces the problem of foaming on incorporation of the preparation into aqueous printing ink systems. The pigment preparation of the invention likewise has the effect that the "final viscosity" is more quickly reached in the pigmented printing ink. The thusly pigmented printing inks are stable in storage and particularly readily redispersible.

The pigment preparations of the invention are likewise stable in storage and do not tend to separate or change in composition in the storage vessel.

An essential constituent of the pigment preparation according to the invention is effect pigments, for example pearl luster pigments, interference pigments, multilayer pigments, platelet-shaped metal oxides, for example $Fe_2O_3$, $TiO_2$, $SiO_2$, $Al_2O_3$, coated with one or more metal oxides and/or metal sulfides, holographic pigments, functional pigments based on platelet-shaped substrates and also all luster pigments known to one skilled in the art.

The use of an organic solvent or solvent mixture, preferably the use of an ester, ketone, alcohol, mineral oil or aromatic solvent, provides excellent wetting of the effect pigment, especially in the case of pigments having a high porosity, for example pearl luster pigments. Pearl luster pigments used are pigments based on platelet-shaped, transparent or semitransparent substrates composed for example of sheet-silicates such as, for example, natural or synthetic mica, talcum, sericite, kaolin, composed of glass or other silicatic materials composed of glass or graphite, coated with colored or colorless metal oxides, for example $TiO_2$, titanium suboxides, titanium oxynitrides, $Fe_2O_3$, $Fe_3O_4$, $SnO_2$, $Cr_2O_3$, ZnO, CuO, NiO and other metal oxides alone or mixed in a single layer or in successive layers. Pearl luster pigments are known for example from German patents and patent applications 14 67 468, 19 59 998, 20 09 566, 22 14 454, 22 15 191, 22 44 298, 23 13 331, 25 22 572, 31 37 808, 31 37 809, 31 51 343, 31 51 354, 31.51 355, 32 11 602, 32 35 017 and P 38 42 330 and commercially available, for example under the mark of Iriodin® from Merck KGaA, Darmstadt, Germany. Particularly preferred pigment preparations contain $TiO_2$/mica, $Fe_2O_3$/mica and/or $TiO_2/Fe_2O_3$ mica pigments.

Preference is further given to $TiO_2$—and/or $Fe_2O_3$-coated $SiO_2$ or $Al_2O_3$ platelets. The $SiO_2$ platelets can be coated with one or more metal oxides as described for example in WO 93/08237 (wet-chemical coating) or DE-A 196 14 637 (CVD process). Coated $Al_2O_3$ platelets are known for example from EP 0 763 573.

The pigment preparations of the invention may contain one or more effect pigments. Frequently, the use of at least two different effect pigments will provide special color and luster effects.

The pigment preparation of the invention preferably contains $\geq 70\%$ by weight of effect pigments, especially $\geq 80\%$ by weight. Very particular preference is given to pigment preparations having an effect pigment content of more than 85% by weight. Preference is given to using one or more pearl luster pigments. The weight percentages are based on the pasted-up pigment preparation.

Organic solvents useful for the pigment preparation of the invention, especially if it is to be used in printing and packaging, include esters, alcohols, di- and trialcohols, ketones, polyols, mineral oils and/or aromatic solvents.

The solvents mentioned have evaporation numbers of 10 to 100 in order to ensure relatively rapid drying in particular in printing, as on high-speed printing presses. Preferably the evaporation number (EN) of the solvent or solvent mixture used is in the range from 12 to 40, especially in the range from 15 to 30 (diethyl ether=1) to ensure rapid drying and to minimize the odour of the print. The surface tension of the solvent should be $\leq 35$ nM/m, especially $\leq 30$ mN/m.

As well as the evaporation number, the solvent should preferably have a dielectric constant $\geq 4$, preferably $\geq 6$. The viscosity of the solvents or solvent mixtures used is generally in the range of $\leq 20$ cp, preferably $\leq 5$ cp.

Solvents that meet the stated conditions for the physical parameters are for example 4-methyl-2-pentanol (EN=66; ST=22.7), 2-butanol (EN=15; ST=23.3), 2,6-dimethyl-4-heptanone (EN=48; ST=22.6), 1-methoxy-2-propyl acetate (EN=34; ST=27.6), xylene (EN=17.3, ST=28.7), Aromatic 100* (aromatic solvent mixtures including xylene, cumene, ethylbenzene, naphthalene, toluene, and benzene) as available for example from Eastman (EN=41.7, ST=29.0) (technical data sheet from Eastman, M-167 R, November 1992).

Alkylene glycol alkyl ethers, for example ethylene glycol monobutyl ether (EN=160), diethylene glycol n-butyl ether (EN=37.50), propylene glycol n-butyl ether (EN=156), solvents as used in the prior art U.S. Pat. No. 5,234,496, possess excessively high evaporation numbers and are therefore not suitable for the pastings according to the invention.

It is frequently advisable to include in the pigment preparation of the invention a wetting agent or a surface-active substance in amounts of 0 to 5% by weight, preferably 0.01 to 3% by weight, especially 0.05 to 1% by weight. Useful wetting agents are in particular wetting agents that contain a hydrophobic side chain, for example alkylsilanes, which may also contain a further functional group, unsaturated or saturated fatty acids or fluorosurfactants. Particular preference is given to silane compounds of the formula $(C_nH_{2n+1})Si(OC_mH_{2m+1})_3$, where n is 1–30 and m is 1–10, as surface-active substances. Suitable silane compounds are for example n-hexyldecyltriethoxysilane and n-octyldecyltriethoxysilane (Si 116 and Si 118 respectively from Degussa Hüls AG, Frankfurt, FRG) and also the corresponding fluoroalkylsilanes.

Useful surface-active substances further include saturated and unsaturated fatty acids, for example caproic acid, caprylic acid, capric acid, lauric acid, myristic acid, palmitic acid, stearic acid, oleic acid, linoleic acid and also mixtures thereof.

Useful surfactants have a relatively long alkyl chain, which may be singly or multiply fluorinated, and a hydrophilic or organophilic head group, for example a polyoxyethylene, carboxyl or sulfone group. They have a cationic, nonionic or anionic construction. Fluorosurfactants used in particular are fluorosurfactants sold under the trade names of FLUORAD FC430® and FC431® (from 3M) and Borchigol FT448® (from Borchers, Düsseldorf, Germany).

The pigment preparation preferably includes a silane, a surfactant or a fatty acid. The surface-active reagent may also be a mixture of silane, fatty acids and/or surfactants.

Useful surface-active substances further include sheet-silicates, especially sheet-silicates from the group of the smectite series, for example montmorillonite/beidellite series. The smectites mentioned are especially notable for their pronounced swellability. Commercially, these products are available for example under the mark of laponite®, a synthetic sodium magnesium lithium silicate (similar to hectorite), marketed by Laporte UK or Südchemie, RFG under names Optigel CG®, a bentonite, or tixogel PE®, an organophilic hydrophobicized smectite. But micalike silicates of the vermiculite and illite series and mica itself (muscovite, phlogopite, biotite) are also suitable. The decisive criterion is the platelet-shaped consistency of the particles and their ability to be digested in the spray-drying process.

For the surface modification it is also possible to employ mixtures of the abovementioned sheet-silicates and also modified sheet-silicates. Preference is given to using the sheet-silicates in activated form, ie. the silicates are dispersed in water, converted into a sol and subsequently spray-dried.

The pigment preparation of the invention may have added to it, during or after its preparation, further customary additives, for example defoamers, wetting agents, antisettling agents, flow agents or thixotroping agents. These are auxiliaries which are customary in the printing industry and which can be present in the pigment preparation of the invention in an amount of 0 to 10% by weight. The pigment may also contain a redispersant.

The pigment preparation of the invention is simply prepared by adding the solvent and optionally further additives simultaneously or in succession to the effect pigment or effect pigment mixture and homogenizing the mix in a mixing apparatus, especially a Dispermat. Preferably the pigment is introduced as initial charge and pasted up with a little solvent.

The preparation of the invention is used in coating systems in the areas of printing, coatings and paints. The preparation is particularly preferably applied for decorative and/or protective purposes to any substrate materials, for example metals such as iron, steel, aluminium, copper, bronze, brass and also metal foils but also metal-coated surfaces of glass, ceramic and concrete, but also to wood, for example furniture, clay, textile, paper, packaging materials, for example plastics containers, films or paperboards, or to other materials.

The invention thus also provides for the use of the pigment preparation in formulations such as paints, coatings, printing inks and plastics.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above, and of corresponding German application No. 199 55 477.3, filed Nov. 18, 1999, is hereby incorporated by reference.

EXAMPLES

Example 1

540 g of Iriodin® 123 ($TiO_2$ mica pigment having a particle size of 5–20 μm from Merck KGaA, Germany) are introduced as initial charge and 60 g of 1-methoxy-2-propyl acetate (EN=34, ST=27.6) are added with stirring. The mix is homogenized and the moist, homogeneous product is discharged and filled gastight into glass bottles.

Example 2

1020 g of $Fe_2O_3$-coated $SiO_2$ platelets of particle size 5–40 μm from Merck KGaA, Germany are introduced as initial charge and 180 g of 2,6-dimethyl-4-heptanone (EN=48, ST=22.6) are added with stirring. The mix is homogenized and the moist, homogeneous product is discharged and filled gastight into glass bottles.

Example 3

540 g of Iriodin® 123 ($TiO_2$ mica pigment having a particle size of 5–20 μm from Merck KGaA, Germany) are introduced as initial charge and a 1:1 mixture of 30 g of 1-methoxy-2-propyl acetate and 30 g of 2,6-dimethyl-4-heptanone is added with stirring. The mix is homogenized and the moist, homogeneous product is discharged and filled gastight into glass bottles.

Example 4

270 g of Xirallic® Crystal Silver ($TiO_2$-coated $Al_2O_3$ platelets of particle size 10–30 μm, from Merck KGaA, Germany) are introduced as initial charge and 30 g of 2,6-dimethyl-4-heptanone are added with stirring. The mix is homogenized and the moist, homogeneous product is discharged and filled gastight into glass bottles.

Example 5

Paliocrom® L 2000 (iron-oxide-coated aluminium of particle size 10–36 μm, from BASF, Germany) are introduced as initial charge and 60 g of 1-methoxy-2-propyl acetate (EN=34, ST=27.6) are added with stirring. The mix is homogenized and the moist, homogeneous product is discharged and filled gastight into glass bottles.

Example 6

540 g of Iriodin® 123 ($TiO_2$ mica pigment having a particle size of 5–20 μm from Merck KGaA, FRG) are introduced as initial charge and 60 g of 1-methoxy-2-propyl acetate and 12 g of Laponite® RDS (natural sheet-silicate from Laporte) are added with stirring. The mix is homogenized and the moist, homogeneous product is discharged and filled gastight into glass bottles.

Example 7

540 g of Iriodin® 123 ($TiO_2$ mica pigment having a particle size of 5–20 μm from Merck KGaA, FRG) are introduced as initial charge and 60 g of 1-methoxy-2-propyl acetate and 5 g of Byk 307 (silicone surfactant from Byk) are added with stirring. The mix is homogenized and the moist, homogeneous product is discharged and filled gastight into glass bottles.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A nondusting homogeneous pigment preparation, comprising
   ≧70% by weight of at least one effect pigment
   0.1–30% by weight of an organic solvent or solvent mixture having an evaporation number (EN) of 10 to 100 and a surface tension (ST) of ≦35 mN/m, which is 4-methyl-2-pentanol, 2-butanol, 2,6-dimethyl-4-heptanone, 1-methoxy-2-propyl acetate, xylene or a mixture of xylene, cumene, ethylbenzene, naphthalene, toluene and benzene
   and optionally
   0–5% by weight of a surface-active agent.

2. The nondusting homogeneous pigment preparation according to claim 1, wherein the effect pigment is a pearl luster pigment.

3. The nondusting homogeneous pigment preparation according to claim 2, wherein the pearl luster pigment comprises $TiO_2$- and/or $Fe_2O_3$-coated mica platelets.

4. The nondusting homogeneous pigment preparation according to claim 1, wherein the solvent is 1-methoxy-2-propyl acetate.

5. The nondusting homogeneous pigment preparation according to claim 1, containing a surface-active substance which is a fluorosurfactant, a silicone surfactant, a silane, a sheet-silicate or a fatty acid.

6. The nondusting homogeneous pigment preparation according to claim 1, further comprising a redispersant.

7. The nondusting homogeneous pigment preparation according to claim 1, further comprising a defoamer, wetting agent, antisettling agent, siccative and/or thixotropic agent.

8. A paint, printing ink, liquid colorant or plastic comprising a pigment according to claim 1.

9. A method for the preparation of a paint, printing ink, liquid colorant or plastic according to claim 8, comprising combining said pigment with conventional paint, printing ink, colorant or plastic components.

10. A method for the preparation of a pigment according to claim 1, comprising mixing an effect pigment with said organic solvent.

11. A nondusting homogeneous pigment preparation, comprising
    ≧70% by weight of at least one effect pigment
    0.1–30% by weight of an organic solvent or solvent mixture having an evaporation number (EN) of 10 to 100 and a surface tension (ST) of ≦35 mN/m,
    and optionally
    0–5% by weight of a surface-active agent, which is a fluorosurfactant, a silicone surfactant, a silane, a sheet-silicate or a fatty acid.

12. The nondusting homogeneous pigment preparation according to claim 11, wherein the effect pigment is a pearl luster pigment.

13. The nondusting homogeneous pigment preparation according to claim 12, wherein the pearl luster pigment comprises $TiO_2$- and/or $Fe_2O_3$-coated mica platelets.

14. The nondusting homogeneous pigment preparation according to claim 11, wherein the organic solvent or solvent mixture is a ketone, an ester, an alcohol, a di- or trialcohol, a polyol, a mineral oil or an aromatic solvent.

15. The nondusting homogeneous pigment preparation according to claim 11, wherein the solvent is 1-methoxy-2-propyl acetate.

16. The nondusting homogeneous pigment preparation according to claim 11, further comprising a redispersant.

17. The nondusting homogeneous pigment preparation according to claim 11, further comprising a defoamer, wetting agent, antisettling agent, siccative and/or thixotropic agent.

18. A paint, printing ink, liquid colorant or plastic comprising a pigment according to claim 11.

19. A method for the preparation of a paint, printing ink, liquid colorant or plastic according to claim 18, comprising combining said pigment with conventional paint, printing ink, colorant or plastic components.

20. A method for the preparation of a pigment according to claim 11, comprising mixing an effect pigment with said organic solvent.

21. A nondusting homogeneous pigment preparation, comprising
  $\geq 70\%$ by weight of at least one effect pigment,
  0.1–30% by weight of an organic solvent or solvent mixture having an evaporation number (EN) of 10 to 100 and a surface tension (ST) of $\leq 35$ mN/m,
  a redispersant,
  and optionally
  0–5% by weight of a surface-active agent.

22. The nondusting homogeneous pigment preparation according to claim 21, wherein the effect pigment is a pearl luster pigment.

23. The nondusting homogeneous pigment preparation according to claim 21, wherein the pearl luster pigment comprises $TiO_2$- and/or $Fe_2O_3$-coated mica platelets.

24. The nondusting homogeneous pigment preparation according to claim 21, wherein the organic solvent or solvent mixture is a ketone, an ester, an alcohol, a di- or trialcohol, a polyol, a mineral oil or an aromatic solvent.

25. The nondusting homogeneous pigment preparation according to claim 21, wherein the solvent is 1-methoxy-2-propyl acetate.

26. The nondusting homogeneous pigment preparation according to claim 21, further comprising a defoamer, wetting agent, antisettling agent, siccative and/orthixotropic agent.

27. A paint, printing ink, liquid colorant or plastic comprising a pigment according to claim 21.

28. A method for the preparation of a paint, printing ink, liquid colorant or plastic according to claim 27, comprising combining said pigment with conventional paint, printing ink, colorant or plastic components.

29. A method for the preparation of a pigment according to claim 21, comprising mixing an effect pigment with said organic solvent.

* * * * *